(12) United States Patent
Weng et al.

(10) Patent No.: US 6,922,333 B2
(45) Date of Patent: Jul. 26, 2005

(54) DETACHABLE KEYBOARD STRUCTURE

(75) Inventors: Shih-Lung Weng, Kaohsiung (TW); Tang-Lung Hsu, Taipei (TW)

(73) Assignee: Benq Corporation, Taoyuan Shien (TW)

(*) Notice: Subject to any disclaimer, the term of this patent is extended or adjusted under 35 U.S.C. 154(b) by 0 days.

(21) Appl. No.: 10/809,206

(22) Filed: Mar. 25, 2004

(65) Prior Publication Data

US 2004/0190239 A1 Sep. 30, 2004

(30) Foreign Application Priority Data

Mar. 26, 2003 (TW) ............................ 92106849 A

(51) Int. Cl.[7] ............................................... G06F 1/16
(52) U.S. Cl. .................... 361/680; 361/683; 220/230; 400/682
(58) Field of Search ................ 361/679–686, 361/139, 142–144, 147; 400/663–667, 679–694; 220/230

(56) References Cited

U.S. PATENT DOCUMENTS 6,366,440 B1 * 4/2002 Kung .......................... 361/147
6,493,215 B1 * 12/2002 Chiang et al. ............... 361/680
6,510,048 B2 * 1/2003 Rubenson et al. .......... 361/680
6,672,796 B2 * 1/2004 Chiang et al. ............... 403/327

* cited by examiner

*Primary Examiner*—Anatoly Vortman
*Assistant Examiner*—Anthony Q. Edwards
(74) *Attorney, Agent, or Firm*—Thomas, Kayden, Horstemeyer & Risley

(57) ABSTRACT

A detachable keyboard structure includes a first magnetic component, a second magnetic component, and a movable component. The first magnetic component is disposed in the wireless keyboard while the second magnetic component is disposed in the computer main body. The first and the second magnetic components produce magnetization due to the opposite magnetisms thereof for attracting the keyboard to the computer main body. The moveable component is capable of transferring the magnetic relation between the first magnetic component and the second magnetic component. When the moveable component is forced to move and therefore transfer the magnetic relation, the first and the second magnetic components produce repellence with each other due to the same magnetism thereof for detaching the keyboard from the computer main body.

30 Claims, 6 Drawing Sheets

DETACHABLE KEYBOARD STRUCTURE

This application claims the benefit of Taiwan application Serial No. 092106849, filed Mar. 26, 2003, the subject matter of which is incorporated herein by reference.

BACKGROUND OF THE INVENTION

1. Field of the Invention

The invention relates in general to a detachable structure, and more particularly to the detachable keyboard structure.

2. Description of the Related Art

Laptop computers typically include a flat panel display such as a liquid crystal display (LCD) screen, a main unit containing the electrical components (e.g., microprocessor, RAM, ROM, floppy disk and hard disk drives, I/O support circuitry), and a keyboard utilized to interact with the laptop computer. Conventionally, the keyboard is fixed to the computing unit by means of a latching system or fasteners (e.g., screws, bolts). The computer housing design is limited due to the fixed keyboard position, since the keyboard must be physically located in front of the LCD screen. In addition, a fixed keyboard does not allow the user to adjust the position of the keyboard with respect to the LCD screen. When the desk the laptop computer sits on is at an unsuitable height, it is uncomfortable for the user to operate the laptop computer. In such circumstances, another keyboard is used to hook up with the computer system to meet the user's requirements; however, it takes up space on the desk, and is often not convenient for the user.

To meet the requirements of different users, wireless technology and detachable keyboard structures have recently been incorporated into laptop computers. The keyboard can be attached to and detached from the computer's main body and communicate with the computer by way of wireless. Typically, the completely detachable keyboard communicates with the computer via infrared signals. Accordingly, the relative positions of the keyboard and LCD screen can be arranged and adjusted to suit the user, thereby providing a more ergonomically usable laptop computer.

The design of detachable keyboard structures has a few key points that need to be considered, such as efficiency of keyboard assembly and disassembly, the aesthetic profile of the laptop computer, and whether the keyboard attaches securely to the main body of the computer. However, a laptop computer with such a well-structured detachable keyboard is not commercially available. For example, a keyboard with an easily assembled and disassembled structure typically requires a more complicated design, and also has a larger footprint. Correspondingly, the keyboard with a more complicated design may have an aesthetically unpopular computer profile. In some laptop computer designs, the keyboards are removable from the computers by means of a damping system, wherein the damping system is usually stored in the center of the computer main body. The damping system is used to eject the removable keyboard from the main body of the computer. But a damping system may cause the keyboard to shake lightly up and down after the keyboard is reattached to the main body.

Thus, there is a need to develop a keyboard structure with a simple, yet more effective design for detaching from and attaching to the laptop computer, while also being able to firmly secure the keyboard to the computer main body after assembly.

SUMMARY OF THE INVENTION

It is therefore an object of the invention to provide a detachable keyboard structure, so that the keyboard can be easily attached to and detached from the main body of the computer by means of magnetic attraction and repulsion.

The invention achieves the above-identified objects by providing a detachable keyboard structure that allows attachment of the keyboard to the main body of the computer. The detachable keyboard structure comprises a first magnetic component, a second magnetic component and a movable component. The first magnetic component, disposed at the keyboard, has a first north (N) magnetic pole and a first south (S) magnetic pole. The second magnetic component, disposed at the main body, has a second north (N) magnetic pole and a second south (S) magnetic pole. Also, the first N and S magnetic poles are arranged opposite to the second N and S magnetic poles, so that the first and the second magnetic components attract each other due to the opposite magnetisms thereof thus attracting the keyboard to the main body. The movable component is capable of reversing the magnetic relationship between the first magnetic component and the second magnetic component. When the moveable component is forced to move and therefore reverse the magnetic relationship, the first and the second magnetic components repel each other and, the keyboard detaches from the main body.

According to an object of the invention, a keyboard module is further provided, comprising a keyboard, a magnetic switch and a locking system. The keyboard is removably attached to the main body. The magnetic switch is used for detaching the keyboard from the main body or attaching the keyboard to the main body. The locking system is used for securing a bottom surface of the keyboard to a top surface of the main computer body. The magnetic switch comprises a first magnetic component, a second magnetic component and a movable component. The first magnetic component, disposed at the keyboard, has a first north (N) magnetic pole and a first south (S) magnetic pole. The second magnetic component, disposed at the main body, has a second north (N) magnetic pole and a second south (S) magnetic pole. Also, the first N and S magnetic poles are arranged opposite to the second N and S magnetic poles, so that the first and the second magnetic components attract each other due to the opposite magnetisms thereof thus attracting the keyboard to the main body. The movable component is capable of reversing the magnetic relationship between the first magnetic component and the second magnetic component. When the moveable component is forced to move and therefore reverse the magnetic relationship, the first and the second magnetic components repel each other due to the same polarity thereof and the keyboard detaches from the main body of the computer.

Other objects, features, and advantages of the invention will become apparent from the following detailed description of the preferred but non-limiting embodiments. The following description is made with reference to the accompanying drawings.

DETAILED DESCRIPTION OF THE INVENTION

The drawings used for illustrating the embodiment of the invention show only the major characteristic parts of the process layout in order to avoid obscuring the invention. Accordingly, the specification and the drawings are to be regarded in an illustrative sense rather than in a restrictive sense.

Figure 1:
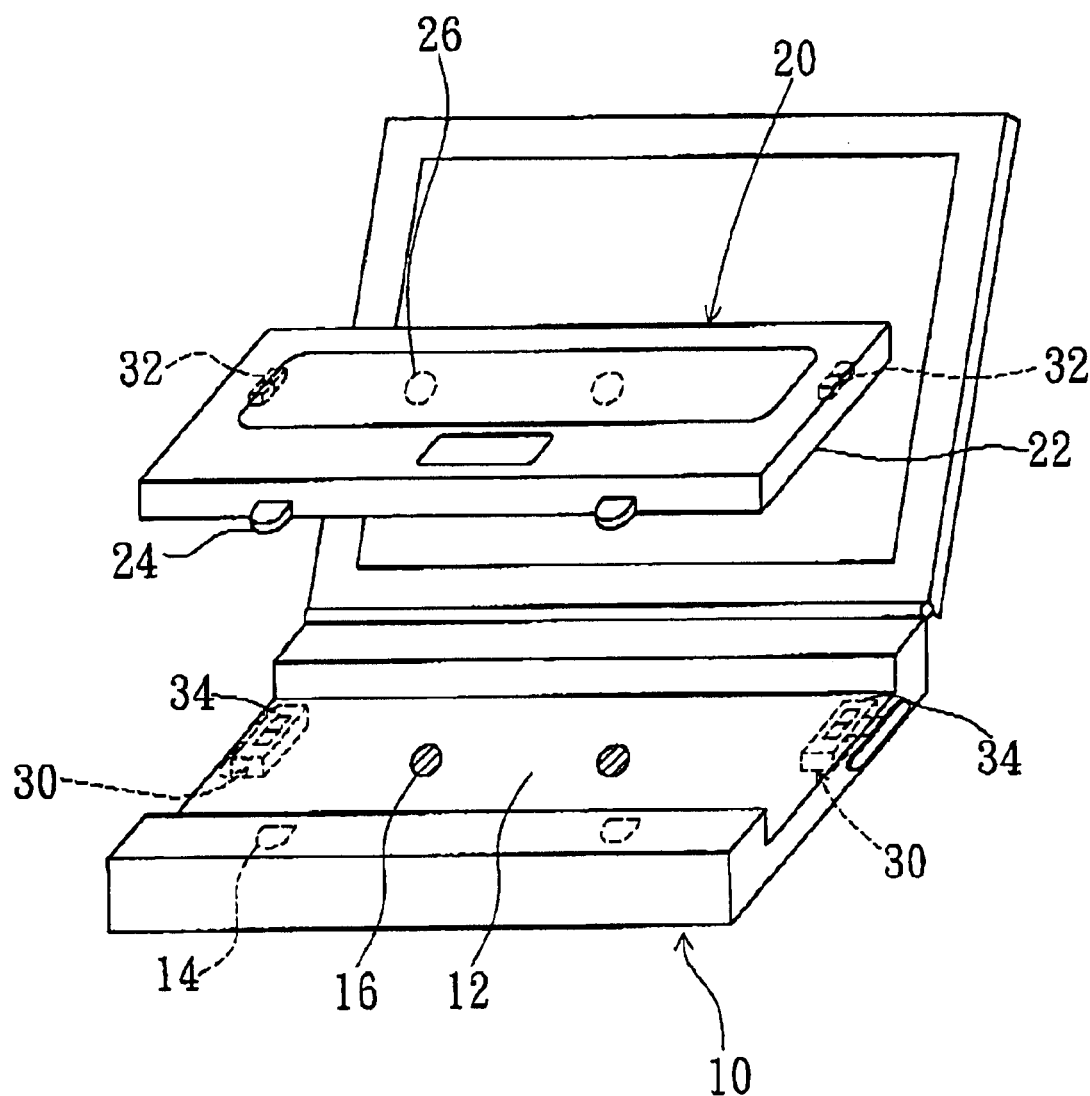
FIG. 1 is perspective view of a laptop computer with a wireless keyboard.

FIG. 1 is perspective view of a laptop computer with a wireless keyboard. The laptop computer comprises three major parts: an LCD screen, a main body 10, and a wireless keyboard 20. The wireless keyboard 20 is removably disposed on the main body 10. The detachable keyboard structure, in accordance with the invention, includes at least a first magnetic component 32, a second magnetic component 34 and a movable component 30. Preferably, those components are hidden behind the hardware of the computer (in the main body or behind the keyboard) in consideration of the aesthetic outline. As illustrated in FIG. 1, a pair of first magnetic components 32, second magnetic components 34 and movable components 30 are used herein. The first magnetic components 32 are preferably embedded in the bottom surface 22 of the wireless keyboard 20. The second magnetic components 34 are preferably embedded in the top surface 12 of the main body 10. This concealed design configuration for the magnetic components maintains a suitable aesthetic profile for the computer main body 10. The moveable component 30 is used for reversing the magnetic relationship between the first magnetic component and the second magnetic component. The moveable component 30, having a containment area for receiving the magnetic component, could be disposed either at the keyboard 20 or at the main body 10. If the moveable component 30 is disposed at the keyboard 20, the containment area is used for receiving the first magnetic component 32. If the moveable component 30 is disposed at the main body 10, the containment area is used for receiving the second magnetic component 34. As shown in FIG. 1, the moveable component 30 is disposed at the main body 10, so that moving the moveable component 30 to change the relative positions of the first magnetic component 32 and second magnetic component 34 can shift the position of the second magnetic component 34. Correspondingly, the assembly and disassembly of the keyboard and main body are achieved by means of a magnetic switch, wherein the magnetic switch is conditional on the magnetic force (attractive or repellent) between the first magnetic component 32 and the second magnetic component 34. Also, if the moveable component 30 is disposed at the wireless keyboard 20, the first magnetic component 32 can be repositioned by moving the moveable component 30 thus changing the relative positions of the first magnetic component 32 and second magnetic component 34, and thereby operating the magnetic switch. The virtual magnetic switch, in accordance with the invention, is easy to operate, highly efficient yet convenient for attaching and detaching the keyboard to and from the computer main body.

Moreover, the detachable keyboard structure of the invention may further comprise a locking system for securing the keyboard to the main body, to prevent unstable situations such as slight shaking during use. The locking system may be an assembly of metallic and magnetic components, several magnets, latches and latch mating elements, or a combination thereof. For example, the magnets 16, as illustrated in FIG. 1, are disposed on the top surface 12 of the main body 10, and the bottom surface 22 of the wireless keyboard 20 is a metallic plate. When the wireless keyboard 20 approaches the top surface 12 of the main body 10, it is attracted and secured to the main body 10 due to magnetic attraction. Conversely, the magnets 16 could be arranged on the bottom surface 22 of the wireless keyboard 20 while the top surface 12 of the main body 10 could be a metallic plate, to achieve the objective of securing the keyboard to the main body. If the locking system consists of several magnets, the magnets 16 and 26 with relative magnetic polarity are correspondingly disposed on the top surface 12 of the main body 10 and the bottom surface 22 of the wireless keyboard 20, respectively. Thus, the keyboard 20 can be secured to the main body 10 by magnetic attraction. Also, the latches and latch mating elements could be used as the locking system. The latches 24 are configured to engage the latch mating elements 14. Preferably, the latches 24 are positioned at the front edge of the wireless keyboard 20, and the latch mating elements 14 are correspondingly positioned within the inner peripheral surface of the main body 10. During assembly, the wireless keyboard 20 is folded downward and the latches 24 are inserted into the latch mating elements 14, to secure the keyboard 20 in place.

Figure 2A:
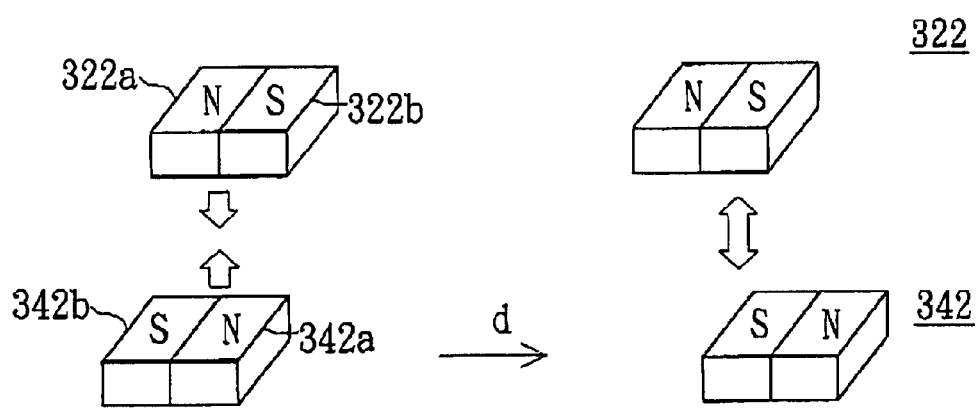
FIG. 2A~FIG. 2C illustrate the operation of magnetic switch of keyboard module according to the embodiments of the invention.
Figure 2B:
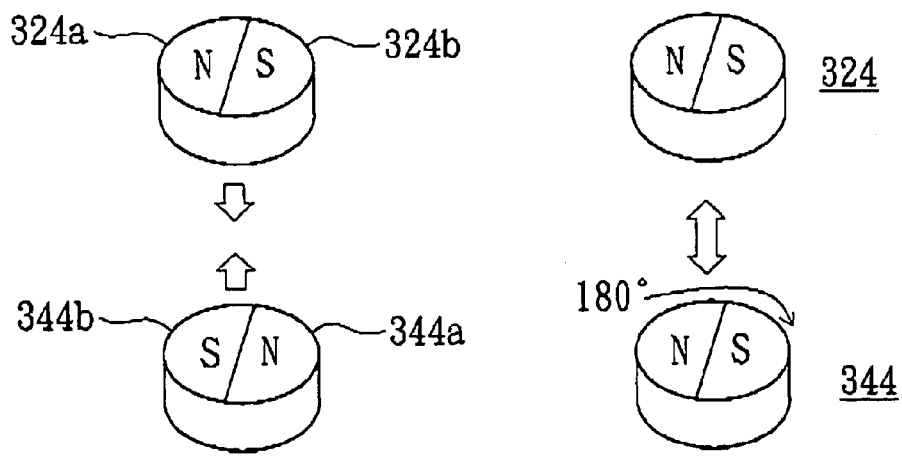
Figure 2C:
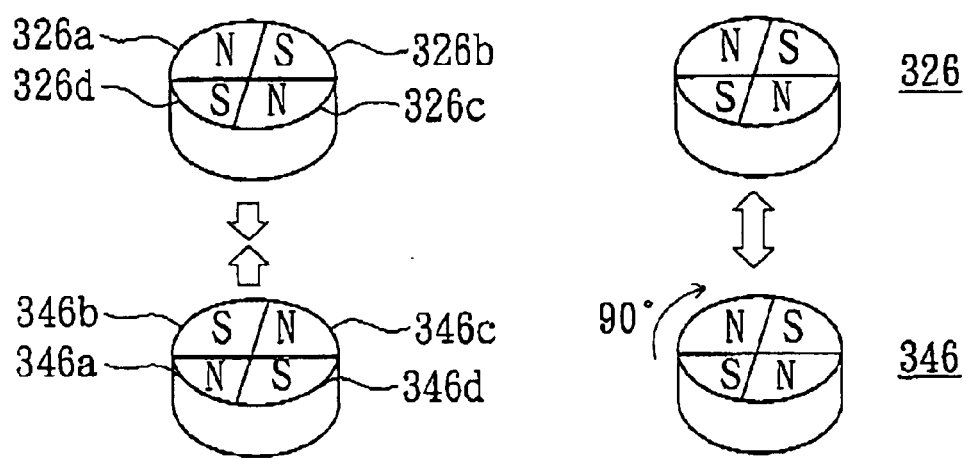

FIG. 2A~FIG. 2C illustrate the operation of the magnetic switch of the keyboard module according to the embodiments of the invention. Also refer to FIG. 1. The first magnetic components 322, 324 and 326 are fixedly disposed on the wireless keyboard 20, while the second magnetic components 342, 344 and 346 are removably disposed on the main body 10. In the embodiments, the magnetic switch is a shifting type switch or a rotational type switch. In addition, a shifting type moveable component, or a rotational type moveable component can reverse the magnetic relationship between the first magnetic component and the second magnetic component.

In FIG. 2A, the magnetic relationship reversal between the first magnetic component and the second magnetic component is achieved by shifting the moveable component. The first magnetic component 322 has a first north (N) magnetic pole 322a and a first south (S) magnetic pole 322b. The second magnetic component 342 has a second N magnetic pole 342a and a second S magnetic pole 342b. In one situation, the first N magnetic pole 322a and the first S magnetic pole 322b are respectively positioned opposite the second S magnetic pole 342b and the second N magnetic pole 342a Consequently, the wireless keyboard 20 is attached to the main body 10 of the computer as a result of the magnetic attraction between the first magnetic component 322 and the second magnetic component 342. However, when the shifting type moveable component (not shown in FIG. 2A) is acted on by an external force the second magnetic component 342 moves away from the original position at a distance of d (the moving direction is depicted in FIG. 2A) and the first S magnetic pole 322b will be positioned opposite the second S magnetic pole 342b. The resulting magnetic repulsion will push the wireless keyboard 20 away from the main body 10. Similarly, the second magnetic component 342 can be moved in the other direction and position the first N magnetic pole 322a opposite the second N magnetic pole 342a, thus producing magnetic repulsion between the first magnetic component 322 and the second magnetic component 342.

In FIG. 2B, the magnetic relationship reversal between the first magnetic component and the second magnetic component is achieved by rotating the moveable component. The first magnetic component 324 has a first N magnetic pole 324a and a first S magnetic pole 324b. The second magnetic component 344 has a second N magnetic pole 344a and a second S magnetic pole 344b. In one situation, the first N magnetic pole 324a and the first S magnetic pole 324b are respectively positioned opposite the second S magnetic pole 344b and the second N magnetic pole 344a Consequently, the wireless keyboard 20 can be attached to the main body 10 of the computer by magnetic attraction between the first magnetic component 324 and the second magnetic component 344. However, when the rotating type moveable component (not shown in FIG. 2B) is acted on by an external force to rotate the second magnetic component 344 at an angle of 180 degree (the moving direction is clockwise as shown in FIG. 2B), the first S magnetic pole 324b will face the second S magnetic pole 344b and magnetic repulsion will push the wireless keyboard 20 away from the main body 10. Also, the second magnetic component 344 can be rotated counterclockwise to produce magnetic repulsion between the first magnetic component 324 and the second magnetic component 344.

In FIG. 2C, the magnetic relationship reversal between the first magnetic component and the second magnetic component is also achieved by rotating the moveable component, however, in this case, each magnetic component possesses 4 magnetic regions. The first magnetic component 326 has the first N magnetic poles 326a, 326c and the first S magnetic poles 326b, 326d. The second magnetic component 346 has the second N magnetic poles 346a, 346c and the second S magnetic poles 346b, 346d. In one situation, the first N magnetic poles 326a, 326c and the first S magnetic poles 326b, 326d are respectively positioned opposite the second S magnetic poles 346b, 346d and the second N magnetic poles 346a, 346c. Consequently, the wireless keyboard 20 can be held to the main body 10 of the computer by magnetic attraction between the first magnetic component 326 and the second magnetic component 346. If a rotating type moveable component (not shown in FIG. 2C) is acted on by an external force to rotate the second magnetic component 346 at an angle of 90 degree (the moving direction is clockwise as shown in FIG. 2C), the first S magnetic poles 326b, 326d will be positioned opposite the second S magnetic poles 346b, 346d, and magnetic repulsion will push the wireless keyboard 20 away from the main body 10. Also, the second magnetic component 346 can be rotated in a counterclockwise direction at an angle of 90 degree to produce magnetic repulsion between the first magnetic component 326 and the second magnetic component 346.

Figure 3A:
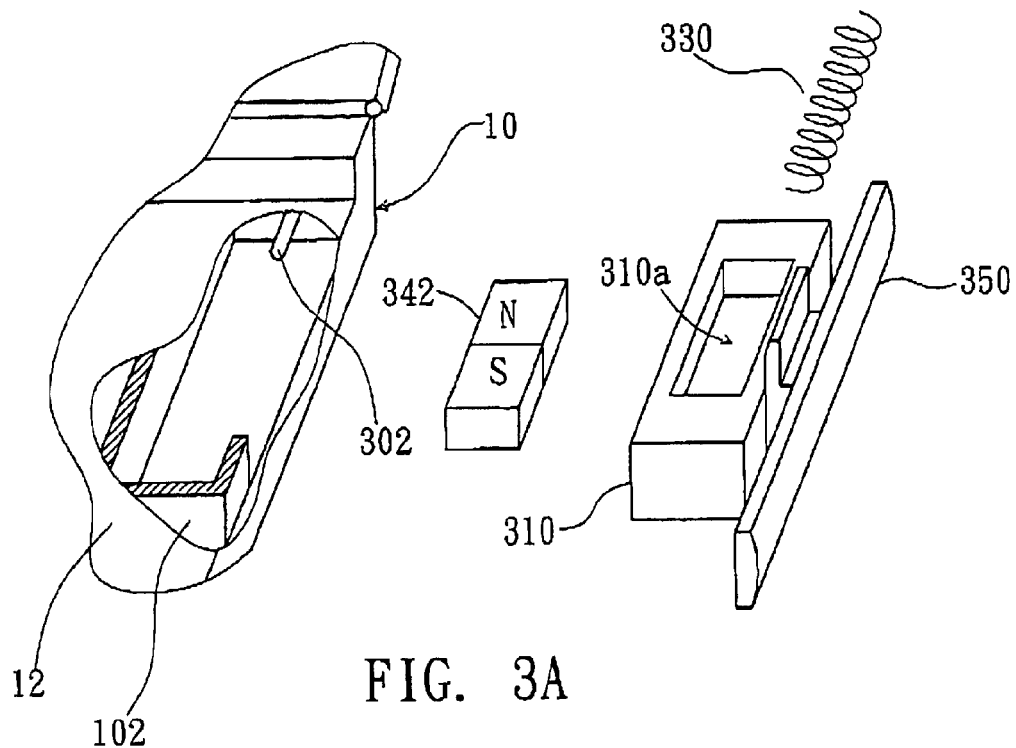
FIG. 3A is a disassembling view of a shifting type movable component according to the first embodiment of the invention.
Figure 3B:
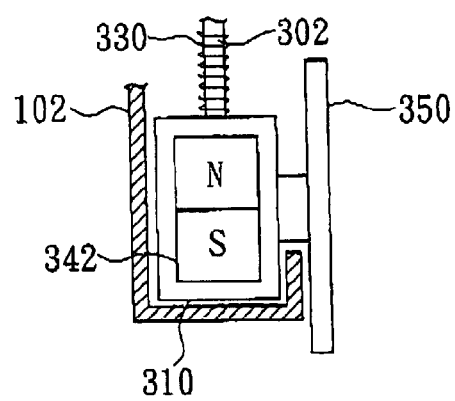
FIG. 3B is a top view of the shifting type movable component shown in FIG. 3A.

FIG. 3A is a disassembled view of a shifting type movable component according to the first embodiment of the invention. The shifting type movable component includes a carrier 310, a movable part 350 and an elastic portion 330. The carrier 310 has a receiving hole 310a for accepting the second magnetic component 342, and the movable part 350 is integrally connected to the carrier 310, as shown in FIG. 3A. The detachable keyboard structure further includes a slide rail 302 and a barrier 102 located on the main body 10 of the computer. FIG. 3B is a top view of the shifting type movable component shown in FIG. 3A. Preferably, the elastic portion 330 is a spring, wherein one end of the spring is disposed on the slide rail 302 with the other end coupled with the carrier 310. When an external force pushes the shifting type movable component, the movable part 350 coupled with the carrier 310 is forced to move along the slide rail 302. Meanwhile, the spring 330 is compressed by the carrier 310 and pushed inward. When the external force is no longer applied, the spring 330 releases and the carrier 310 returns to its original position. The barrier 102 is configured to prevent the carrier 310 from excessive movement and ensure it returns to its original position.

Figure 4A:
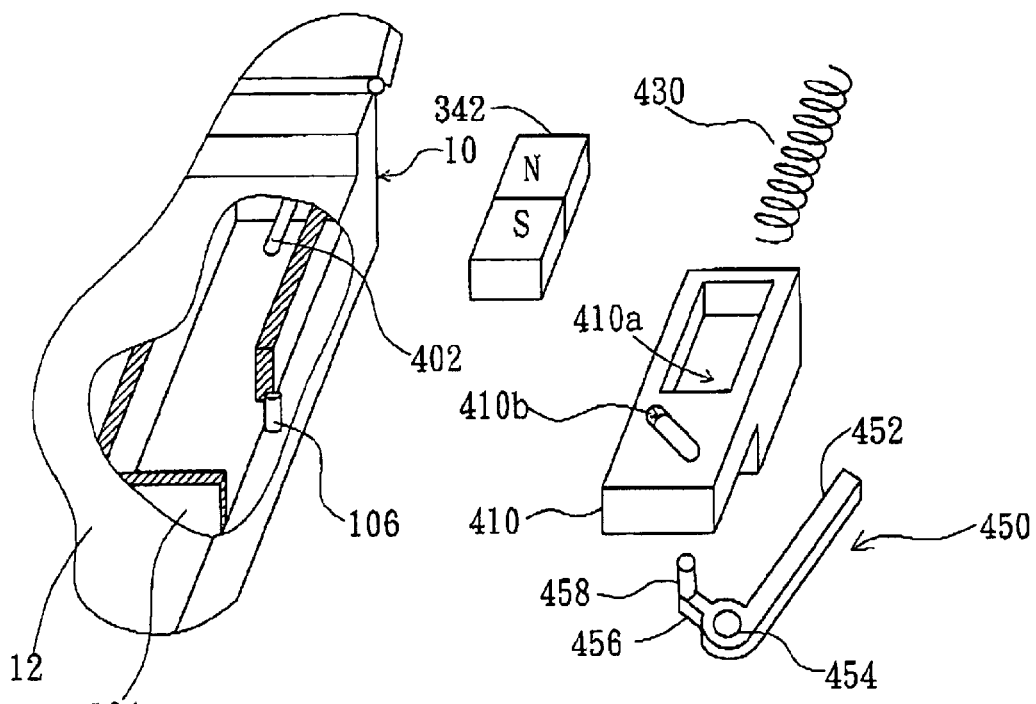
FIG. 4A is a disassembling view of a shifting type movable component according to the second embodiment of the invention.
Figure 4B:
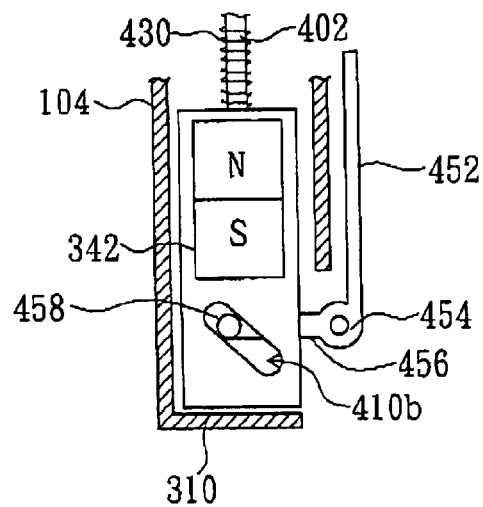
FIG. 4B is a top view of the shifting type movable component shown in FIG. 4A.

FIG. 4A is a disassembled view of a shifting type movable component according to the second embodiment of the invention. The shifting type movable component includes a carrier 410, a movable part 450 and an elastic portion 430. The movable part 450 includes a movable arm 452, an axle hole 454 and a push arm 456. The carrier 410 has an aperture 410a for accepting the second magnetic component 342, and a diagonal slot 410b open through the carrier 410. As shown in FIG. 4A, the detachable keyboard structure further includes a slide rail 402, a barrier 104 and a fixed pivot 106 located at the main body 10 of the computer. FIG. 4B is a top view of the shifting type movable component shown in FIG. 4A. One end of the elastic portion 430, such as a spring, is disposed on the slide rail 402, and the other end is coupled with the carrier 410. The push arm 456 of the movable part 450 has a projecting pin 458 for movably mating with the diagonal slot 410b of the carrier 410. The axle hole 454 of the movable part 450 is mounted on the fixed pivot 106 on which the movable arm 452 and the push arm 456 swing. When an external force acts on the shifting type movable component the movable arm 452 and the push arm 456 swing on the fixed pivot 106, and thereby move the push arm 456 in the diagonal slot 410b. Meanwhile, the spring is compressed as the carrier 410 is pushed inward. Subsequently, when an externally applied force pushes the movable part 450, the carrier 410 is laterally moved along the slide rail 402 of the main body 10. When the external force is no longer applied, the carrier 410 is returned toward the original position and the projecting pin 485 moves downward along the diagonal slot 410b as the press of the spring is released. Meanwhile, the movable arm 452 and the push arm 456 swing on the fixed pivot 106 in a counterclockwise direction. Finally, the barrier 104 stops the movement of the carrier 410, and the carrier 410 returns to its original position.

Figure 5A:
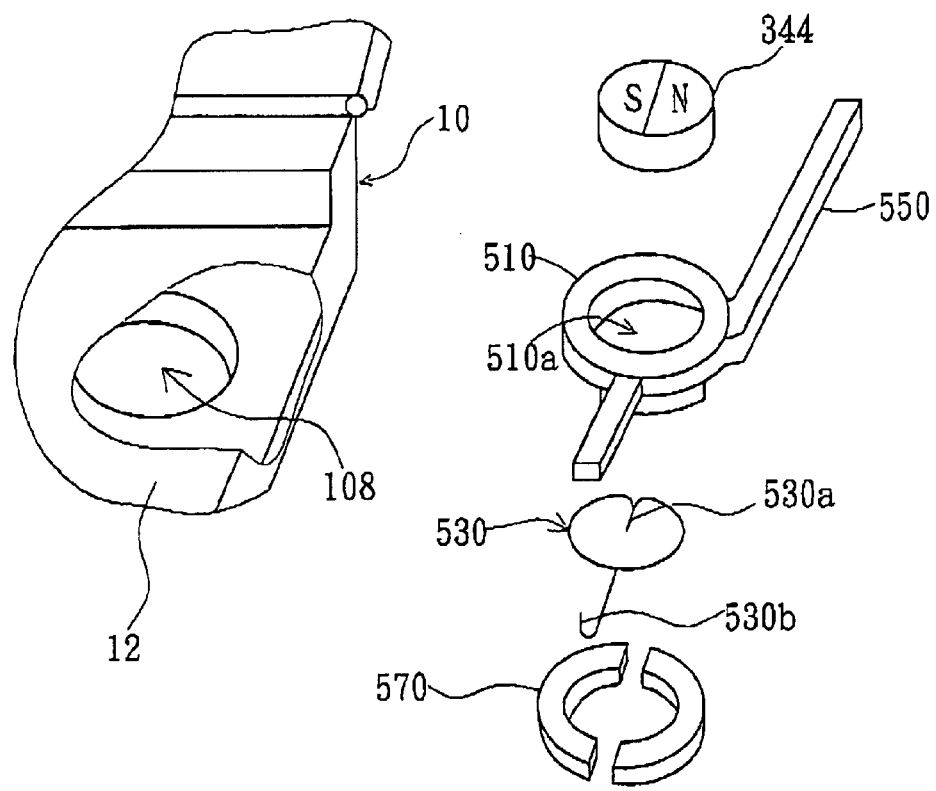
FIG. 5A is a disassembling view of a rotating type moveable component according to the first embodiment of the invention.
Figure 5B:
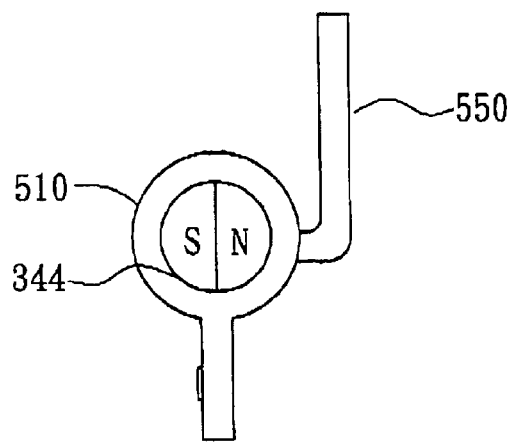
FIG. 5B is a top view of the rotating type movable component shown in FIG. 5A.

FIG. 5A is a disassembled view of a rotating type moveable component according to the first embodiment of the invention. FIG. 5B is a top view of the rotating type movable component shown in FIG. 5A. The rotating type movable component includes a carrier 510, a movable part 550, an elastic portion 530 and a pivot portion 570. The movable part 550 is configured as a rotating arm, and the carrier 510 has an aperture 510a for accepting the second magnetic component 344. Preferably, the elastic portion 530 is a spring coil and disposed between the carrier 510 and the pivot portion 570. Also, one end 530a of the spring coil is connected to the carrier 510, and the other end 530b is connected to the pivot portion 570. After assembly, the pivot portion 570 is disposed into the fixed area 108 of the main body 10 to complete the installation of the rotating type moveable component. Since the pivot portion 570 and the carrier 510 are coaxial, the carrier 510 can be relatively rotated over the pivot portion 570 by applying an external force to the movable part 550. At the same time, the spring coil is deformed. When the external force is no longer applied, the carrier 510 rotates in a counterclockwise direction as the energy of the deformed spring coil is released. The carrier 510 keeps rotating until it returns to its original position.

According to the aforementioned description of the embodiments, the detachable keyboard structure has a magnetic switch, essentially formed by magnetic components with opposite magnetic polarities. This virtual magnetic switch allows easier attachment or detachment of the wireless keyboard to or from the main body of the laptop computer. In addition, the magnetic switch can secure the keyboard on the main body to prevent instability, such as slight shake when the user hits the keys of the keyboard. Furthermore, the simple and clear design of the detachable keyboard structure of the invention meets the aesthetic requirement that no component thereof is visible in the central surface of the main body. In the embodiment of the invention, the illustrations dispose the movable component on the main body and the magnet on the bottom surface of the keyboard. However, the movable component can be disposed on the bottom surface of the keyboard, and the immovable magnet can be disposed on the main body.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A detachable keyboard structure, for detaching a keyboard from a main body, comprising:
   a first magnetic component, having a first north (N) magnetic pole and a first south (S) magnetic pole, and the first magnetic component disposed at the keyboard;
   a second magnetic component, having a second north (N) magnetic pole and a second south (S) magnetic pole, and the second magnetic component disposed at the main body, wherein the first N and S magnetic poles are opposite the second N and S magnetic poles, so that the first and the second magnetic components produce magnetization due to the opposite magnetisms thereof for attracting the keyboard to the main body; and
   a movable component, capable of reversing the magnetic relationship between the first magnetic component and the second magnetic component, wherein the first and the second magnetic components repel each other due to the same magnetic polarity thereof and the keyboard detaches from the main body.

2. The detachable keyboard structure according to claim 1, wherein the movable component comprises:
   a carrier, having a receiving aperture;
   a movable part, connected to the carrier for moving the carrier; and
   an elastic portion, wherein one end of the elastic portion is coupled with the carrier, such that the carrier is shifted back to an original position as pressure on the elastic portion is released.

3. The detachable keyboard structure according to claim 2, wherein the movable component is disposed on the keyboard, and the receiving aperture is used for accepting the first magnetic component.

4. The detachable keyboard structure according to claim 2, wherein the movable component is disposed on the main body, and the receiving aperture accepts the second magnetic component.

5. The detachable keyboard structure according to claim 2, wherein the movable component is a shifting type movable component.

6. The detachable keyboard structure according to claim 5 further comprises a slide rail disposed on the main body for directing the movement of the carrier.

7. The detachable keyboard structure according to claim 6, wherein the elastic portion is a spring.

8. The detachable keyboard structure according to claim 7, wherein the movable part comprises a movable arm and a push arm.

9. The detachable keyboard structure according to claim 8, wherein the carrier has a diagonal slot for removably engaging with the push arm so that, when the movable arm is forced to move, the push arm moves along the diagonal slot and therefore pushes the carrier.

10. The detachable keyboard structure according to claim 2, wherein the movable component is a rotating type movable component.

11. The detachable keyboard structure according to claim 10, wherein the movable component further comprises a pivot portion that is coaxially coupled with the carrier.

12. The detachable keyboard structure according to claim 11, wherein the movable part is a rotating arm to rotate the carrier over the pivot portion.

13. The detachable keyboard structure according to claim 12, wherein the elastic portion is a spring coil disposed between the carrier and the pivot portion, with one end of the spring coil connected to the carrier and the other end connected to the pivot portion.

14. A computer with a detachable keyboard, comprising:
    a main body;
    a keyboard, removably attached to the main body;
    a magnetic switch, for detaching the keyboard from the main body or attaching the keyboard to the main body, comprising:
      a first magnetic component disposed at the keyboard, having a first north (N) magnetic pole and a first south (S) magnetic pole;
      a second magnetic component disposed at the main body, having a second north (N) magnetic pole and a second south (S) magnetic pole, wherein the first N and S magnetic poles are opposite to the second N and S magnetic poles, so that the first and the second magnetic components produce magnetization due to the opposite polarities thereof thus attracting the keyboard to the main body; and
      a movable component, capable of reversing the magnetic relationship between the first magnetic component and the second magnetic components, wherein the first and the second magnetic components repel each other due to the same magnetic polarities thereof thus detaching the keyboard from the main body when the moveable component is forced to move; and
    a locking system, for securing a bottom surface of the keyboard to a top surface of the main body.

15. The computer according to claim 14, wherein the locking system comprises:
    a pair of magnets correspondingly disposed on the bottom surface of the keyboard and the top surface of the main body.

16. The computer according to claim 14, wherein the locking system comprises:
    a magnet, disposed on the top surface of the main body; and
    a metallic layer, disposed on the bottom surface of the keyboard, wherein the keyboard is secured to the main body by a magnetic attraction between the magnet and the metallic layer.

17. The computer according to claim 14, wherein the locking system comprises:
- a magnet, disposed on the bottom surface of the keyboard; and
- a metallic layer, disposed on the top surface of the main body, wherein the keyboard is secured to the main body by magnetic attraction between the magnet and the metallic layer.

18. The computer according to claim 14, wherein the locking system comprises:
- a latch, positioned at a front edge of the keyboard; and
- a latch mating element, positioned at the main body and corresponding to the position of the latch.

19. The computer according to claim 14, wherein the movable component comprises:
- a carrier, having a receiving aperture;
- a movable part for moving the carrier that is connected to the carrier; and
- the carrier, coupled with an elastic portion at one end, which is able to return to its original position when pressure on the elastic portion is released.

20. The computer according to claim 19, wherein the movable component is disposed at the keyboard, and the receiving aperture accepts the first magnetic component.

21. The computer according to claim 19, wherein the movable component is disposed at the main body, and the receiving aperture accepts the second magnetic component.

22. The computer according to claim 19, wherein the movable component is a shifting type movable component.

23. The computer according to claim 22, wherein a slide rail is further disposed within the main body for directing the lateral movement of the carrier.

24. The computer according to claim 23, wherein the elastic portion is a spring that is disposed on the slide rail.

25. The computer according to claim 24, wherein the movable part has a movable arm and a push arm.

26. The computer according to claim 25, wherein the carrier has a diagonal slot for movably mating with the push arm, so that, when the movable arm swings, the push arm is moved along the diagonal slot to drive the carrier.

27. The computer according to claim 19, wherein the movable component is a rotating type movable component.

28. The computer according to claim 27, wherein the movable component has a pivot portion coaxially coupled with the carrier.

29. The computer according to claim 28, wherein the movable part is configured as a rotating arm for driving the carrier to coaxially rotate the pivot portion.

30. The computer according to claim 29, wherein the elastic portion is a spring coil disposed between the carrier and the pivot portion, with one end of the spring coil connected to the carrier and the other end connected to the pivot portion.

* * * * *